US012444185B2

(12) United States Patent
Qian et al.

(10) Patent No.: US 12,444,185 B2
(45) Date of Patent: Oct. 14, 2025

(54) FACIAL RECOGNITION BASED ON CONVERTED SPIKING NEURAL NETWORK

(71) Applicant: UNIVERSITY OF SOUTH CAROLINA, Columbia, SC (US)

(72) Inventors: Yu Qian, Irmo, SC (US); Youzhi Tang, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 330 days.

(21) Appl. No.: 18/313,563

(22) Filed: May 8, 2023

(65) Prior Publication Data
US 2023/0386195 A1 Nov. 30, 2023

Related U.S. Application Data

(60) Provisional application No. 63/438,548, filed on Jan. 12, 2023, provisional application No. 63/346,088, filed on May 26, 2022.

(51) Int. Cl.
*G06V 10/82* (2022.01)
*G06V 10/77* (2022.01)
*G06V 10/774* (2022.01)
*G06V 10/94* (2022.01)
*G06V 40/16* (2022.01)

(52) U.S. Cl.
CPC ............ *G06V 10/82* (2022.01); *G06V 10/774* (2022.01); *G06V 10/94* (2022.01); *G06V 40/172* (2022.01); *G06V 10/7715* (2022.01)

(58) Field of Classification Search
CPC ...... G06V 10/82; G06V 10/774; G06V 10/94; G06V 40/172; G06V 10/7715
See application file for complete search history.

(56) References Cited

U.S. PATENT DOCUMENTS

| | | | |
|---|---|---|---|
| 9,020,870 B1* | 4/2015 | Daily | B25J 9/00 706/20 |
| 2007/0053614 A1* | 3/2007 | Mori | G06V 30/2504 382/299 |
| 2011/0158540 A1* | 6/2011 | Suzuki | G06V 40/171 382/195 |
| 2018/0197076 A1* | 7/2018 | Paik | G11C 11/54 |

(Continued)

OTHER PUBLICATIONS

An et al., "Killing Two Birds with One Stone: Efficient and robust Training of Face Recognition CNN's by Partial FC", arXiv preprint arXiv:2203.15565 (2022), 10 pages.

(Continued)

*Primary Examiner* — Wesley J Tucker
(74) *Attorney, Agent, or Firm* — DORITY & MANNING, P.A.

(57) ABSTRACT

The disclosure deals with a system and method recognizing the same person from different pictures in order to identify who is who based on photos or videos from different sources. Facial recognition plays an increasingly important role in modern life. Due to the low power consumption of Spiking Neural Networks (SNNs), this disclosure proposed an SNNs-based facial recognition model converted from a well-known facial recognition network ArcFace. The experimental results show that SNN (duration=200) achieved 99.00% overall accuracy on the testing dataset and outperformed the original ArcFace.

36 Claims, 2 Drawing Sheets

(a) SNN (duration=50)

(b) SNN (duration=100)

(56) References Cited

U.S. PATENT DOCUMENTS

| | | | | |
|---|---|---|---|---|
| 2019/0042910 | A1* | 2/2019 | Krishnamurthy | G06N 3/049 |
| 2019/0182455 | A1* | 6/2019 | Ankita | G06V 40/172 |
| 2020/0218977 | A1* | 7/2020 | Paul | G06N 3/088 |
| 2021/0081777 | A1* | 3/2021 | Thomas | H10F 30/28 |
| 2021/0357751 | A1* | 11/2021 | Athreya | G06N 3/045 |
| 2022/0138583 | A1* | 5/2022 | Hernandez Rivera | G06N 3/045 706/20 |
| 2023/0154135 | A1* | 5/2023 | Nakagawa | G06V 10/82 382/103 |
| 2023/0206066 | A1* | 6/2023 | McLelland | G06N 3/049 706/25 |
| 2023/0269143 | A1* | 8/2023 | Shahid | G06N 5/01 709/224 |

OTHER PUBLICATIONS

Chen et al., "Unconstrained Still/Video-Based Face Verification with Deep Convolutional Neural Networks", International Journal of Computer Vision 126.2 (2018), 20 pages.

Deng et al., "ArcFace: additive Angular Margin Loss for Deep Face Recognition", Proceedings of the IEEE/CVF conference on computer vision and pattern recognition. 2019, 17 pages.

Guo et al, "MS-Celeb-1M: A Dataset and Benchmark for Large-Scale Face Recognition", European conference on computer vision. Springer, Cham, 2016, 17 pages.

Huang et al., "Labeled Faces in the Wild: A Database for Studying Face Recognition in Unconstrained Environments", Workshop on faces in 'Real-Life' Images: detection, alignment, and recognition. 2008, 11 pages.

Kingma et al, :Adam: A Method for Stochastic Optimization, arXiv preprint arXiv:1412.6980 (2014), 15 pages.

Liu et al., "SpherFace: Deep Hypersphere Embedding for Face Recognition", Proceedings of the IEEE conference on computer vision and pattern recognition. 2017, 13 pages.

Rueckauer et al., "Conversion of Continuous-Valued Deep Networks to Efficient Event-Driven Networks for Image Classification", Frontiers in Neuroscience, vol. 11, Article 682, Dec. 2017. 12 pages.

Schroff et al., "FaceNet: A Unified Embedding for Face Recognition and Clustering", Proceedings of the IEEE conference on computer vision and pattern recognition. 2015, 10 pages.

Simonyan et al., "Very Deep Convolutional Networks for Large-Scale Image Recognition", arXiv preprint arXiv:1409.1556 (2014), 13 pages.

Tavanaei et al., "Deep Learning in Spiking Neural Networks", Neural networks 111 (2019), 23 pages.

Wang et al., "CosFace: Large Margin Cosine Loss for Deep Face Recognition", Proceedings of the IEEE conference on computer vision and pattern recognition. 2018, 11 pages.

* cited by examiner

(a) Last 300 pairs are same people pairs
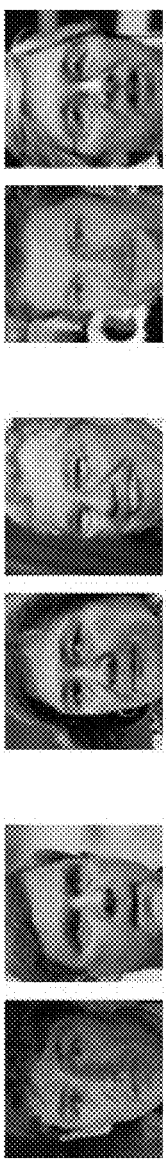
(b) Last 300 pairs are different people pairs
FIG. 1(a)
FIG. 1(b)
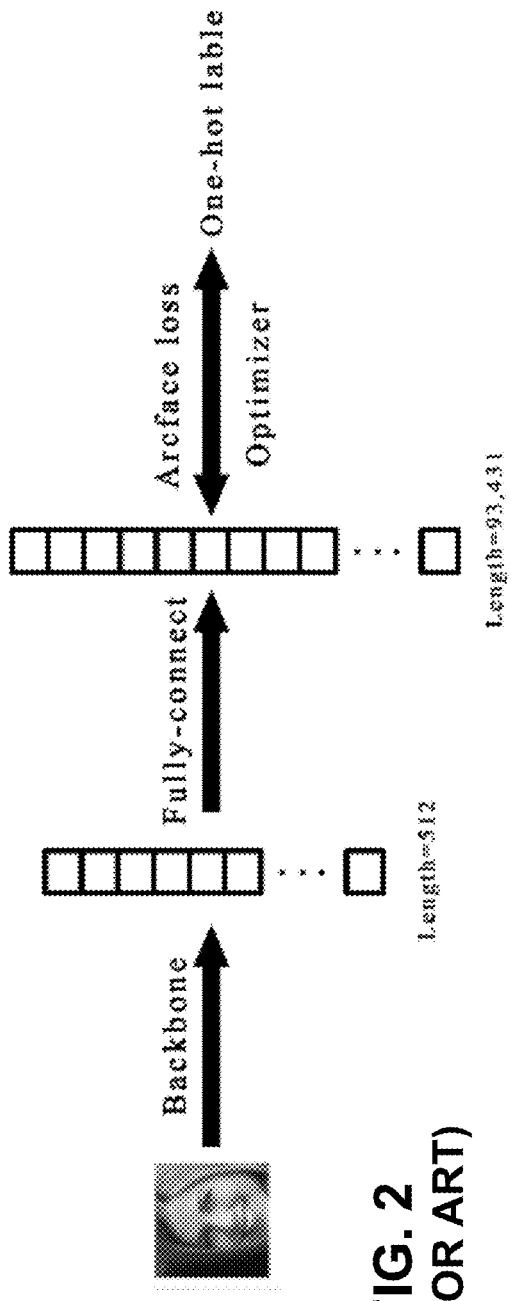
FIG. 2
(PRIOR ART)

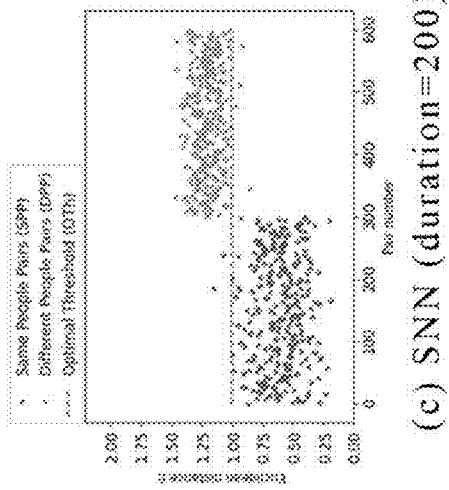
FIG. 3(a)
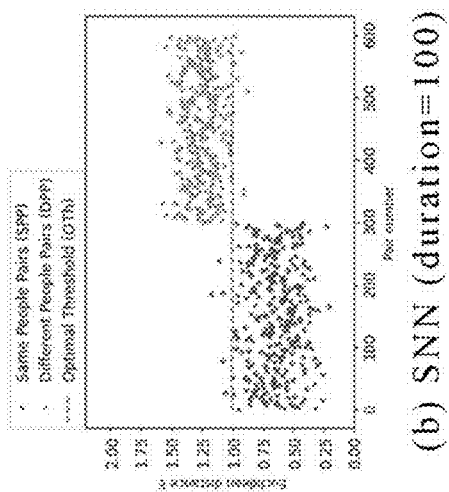
FIG. 3(b)
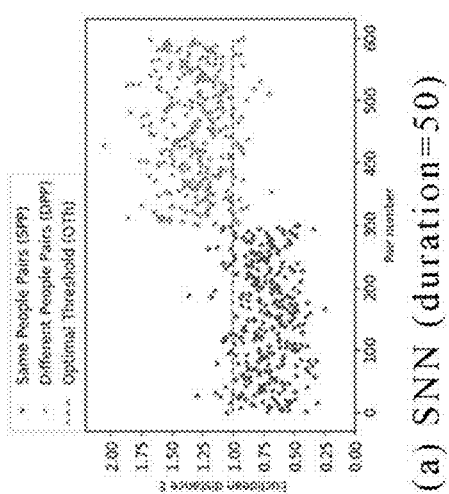
FIG. 3(c)
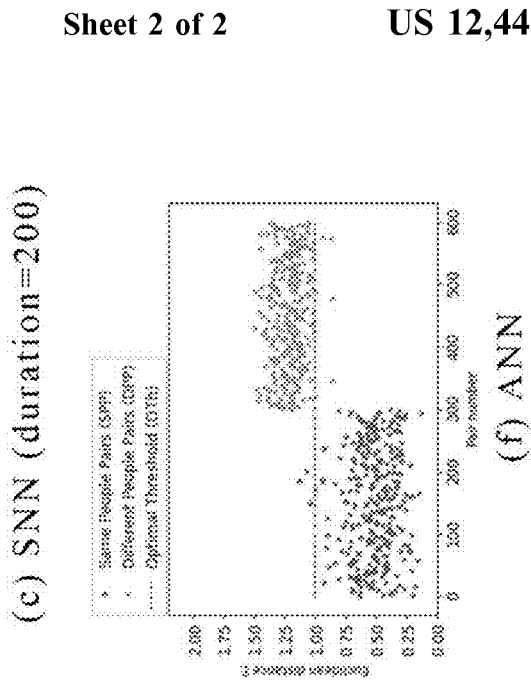
FIG. 3(d)
FIG. 3(e)
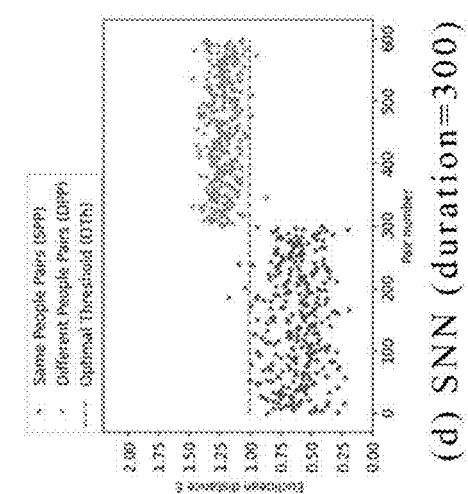
FIG. 3(f)

FACIAL RECOGNITION BASED ON CONVERTED SPIKING NEURAL NETWORK

PRIORITY CLAIMS

The present application claims the benefit of priority of U.S. Provisional Patent Application No. 63/346,088, filed May 26, 2022, and the benefit of priority of U.S. Provisional Patent Application No. 63/438,548, filed Jan. 12, 2023, both of which are titled Facial Recognition Based On Converted Spiking Neural Network, and both of which are fully incorporated herein by reference for all purposes.

STATEMENT REGARDING FEDERALLY SPONSORED RESEARCH OR DEVELOPMENT

This invention was made with government support under Grant No. 693JJ6200000021, awarded by the Federal Railroad Administration. The government has certain rights in the invention.

BACKGROUND OF THE PRESENTLY DISCLOSED SUBJECT MATTER

The disclosure deals with a system and method recognizing the same person from different pictures in order to identify who is who based on photos or videos from different sources. Presently disclosed subject matter relates to the subjects of facial recognition, spiking neural networks, and deep learning. In particular, disclosed subject matter uses a Spiking Neural Networks (SNNs)-based facial recognition model, which advantageously has low power consumption due to use of SNNs.

In recent years, significantly driven by Artificial Neural Networks (ANNs), facial recognition has become a reliable and prominent biometric technique and has been widely used in many applications, such as mobile device unlocking [1]. However, ANNs need to consume a lot of computing power, and deep ANNs have high hardware configuration requirements [2]. Spiking Neural Networks (SNNs) has the potential to be the 3rd generation of neural networks, which exhibit favorable properties in low power consumption and fast inference [3]. Therefore, SNNs-based facial recognition methods are promising in real-world applications.

Many ANN-based facial recognition methods are demonstrated to outperform classical approaches. Schroff et al. proposed Facenet, which uses triple loss for network training; triple loss uses the margin penalty, enhancing intra-class compactness and inter-class discrepancy and achieving high performance on face recognition [4]. However, triple loss requires a data preparation step before the training phase. Several methods were introduced to enhance the discriminative power of the softmax loss and free the data preparation step of the triple loss. Sphereface proposed an angular softmax loss to enforce extra intra-class compactness and inter-class discrepancy [5]. CosFace directly adds a cosine margin penalty to the target logit, which obtains better performance than SphereFace [6]. ArcFace proposed an additive angular margin loss to further improve the discriminative power of the face recognition model, which outperforms forementioned models [7]. In general, ArcFace is a machine learning model that takes two face images as input and outputs the distance between them to see how likely they are to be the same person, such as used for face recognition and/or face search.

However, as illustrated by Chen et al. [2], ANN architectures have to analyze millions of parameters that impose massive computational and memory overhead, so it isn't easy to achieve a balanced compromise between network accuracy and speed. On the other hand, SNNs show favorable speed in inference. SNN imitates the information processing process in biology. The computation results inside the SNNs are always 0 and 1, which significantly minimize the computation costs of the SNN [3].

SUMMARY OF THE PRESENTLY DISCLOSED SUBJECT MATTER

The presently disclosed subject matter deals with a system and method recognizing the same person from different pictures in order to identify who is who based on photos or videos from different sources. In particular, disclosed subject matter uses a Spiking Neural Networks (SNNs)-based facial recognition model, which advantageously has low power consumption due to use of SNNs.

Disclosed is a computer software with an innovative method to recognize the same person from different pictures in order to identify who is who based on photos or videos from different sources.

As of today, there is no effective learning method for training an SNN. This makes SNNs hard to achieve the same level accuracy of the ANN. Up to now, instead of SNN training, converting a trained ANN into SNN is a more effective way for SNN modeling. Therefore, this disclosure modeled the facial recognition SNN by converting a trained ANN using SNN toolbox [8]. Due to the state-of-the-art performance of ArcFace, this disclosure chooses the ArcFace for conversion.

We developed a new Spiking Neural Networks (SNNs)-based facial recognition model converted from a well-known facial recognition network, ArcFace (operating on Additive Angular Margin Loss for Deep Face Recognition). The model we developed can automatically and accurately identify the same person from different images. Further, we have constructed this model into an edge-device-ready model which is able to transfer to a mobile computing board, e.g., Intel® Loihi™, for mobile computing. The experimental results show that the model we developed achieved 99% overall accuracy on the testing dataset and outperformed the original ArcFace model.

The current method for facial recognition requires a lot of computing resources (high-performance computers), which is not portable and has very limited accuracy. Conversely, the model we developed requires significantly less computing and battery power for achieving better recognition accuracy. The accuracy of our model is equal to or better than those existing models that require a high-performance server or high-end GPU/CPU. Further, our model can be loaded into mobile devices, such as cellphones, tablets, computing sticks, and mobile computing boards for increased portability.

Moreover, many companies could utilize the benefits of the model disclosed herein, to include Intel®, various first responders, the Federal Railroad Association, and the U.S. Department of Homeland Security, which could benefit from the disclosed model in a multitude of ways including, but not limited to, security screening at airports, ports, railroad/bus stations, shopping malls, and similar highly populated areas.

In one exemplary embodiment disclosed herewith, a method relates to facial recognition for automatically identifying a person from facial images. Such exemplary method preferably comprises training an Artificial Neural Network (ANN)-based facial recognition machine learning model, based on inputs of a preexisting large-scale facial image dataset for facial recognition, to learn the association between different facial images of the same person; normalizing the parameters of the ANN-based facial recognition machine learning model using a randomly selected subset of facial images which is smaller than the preexisting large-scale dataset used to train the ANN-based facial recognition machine learning model; converting the trained ANN-based facial recognition machine learning model with normalized parameters into a trained Spiking Neural Network (SNN)-based facial recognition model; and operating the trained SNN-based facial recognition machine learning model to process further input data images thereto, to determine and output the identification of the person corresponding with the input images.

It is to be understood that the presently disclosed subject matter equally relates to associated and/or corresponding systems, devices, and apparatuses.

Other example aspects of the present disclosure are directed to systems, apparatus, tangible, non-transitory computer-readable media, user interfaces, memory devices, and electronic devices related to sleep deprivation. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to a computing system. Such exemplary computing system may preferably comprise an Artificial Neural Network (ANN)-based facial recognition machine learning model trained to learn the association between different facial images of the same person, based on inputs of a preexisting large-scale facial image dataset for facial recognition; one or more processors; and one or more non-transitory computer-readable media that store instructions that, when executed by the one or more processors, cause the one or more processors to perform operations. Such operations preferably comprise normalizing the parameters of the ANN-based facial recognition machine learning model using a randomly selected subset of facial images which is smaller than the preexisting large-scale dataset used to train the ANN-based facial recognition machine learning model; converting the trained ANN-based facial recognition machine learning model with normalized parameters into a trained Spiking Neural Network (SNN)-based facial recognition model; and operating the trained SNN-based facial recognition machine learning model to process further input data images thereto, to determine and output the identification of the person corresponding with the input images.

Yet another exemplary embodiment of presently disclosed subject matter relates to one or more tangible, non-transitory computer-readable media that collectively store instructions that, when executed, cause a computing device including one or more processors to perform operations. Such exemplary operations preferably comprise training an Artificial Neural Network (ANN)-based facial recognition machine learning model, based on inputs of a preexisting large-scale facial image dataset for facial recognition, to learn the association between different facial images of the same person; normalizing the parameters of the ANN-based facial recognition machine learning model using a randomly selected subset of facial images which is smaller than the preexisting large-scale dataset used to train the ANN-based facial recognition machine learning model; converting the trained ANN-based facial recognition machine learning model with normalized parameters into a trained Spiking Neural Network (SNN)-based facial recognition model; and operating the trained SNN-based facial recognition machine learning model to process further input data images thereto, to determine and output the identification of the person corresponding with the input images.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 1(a) illustrates examples images of Labeled Faces in the Wild (LFW) dataset involving paired images where the pairs are same people pairs;

FIG. 1(b) illustrates examples images of Labeled Faces in the Wild (LFW) dataset involving paired images where the pairs are different people pairs;

FIG. 2 is a schematic-type chart representing operational aspects and principles of the ArcFace machine-learning model (Prior Art) for facial recognition;

FIGS. 3(a) through 3(e) graphically represent test results using LFW dataset data for 600 pairs, determining performance of a presently-disclosed spiking neural network (SNN) of respective duration criteria of 50, 100, 200, 300, and 400, respectively; and FIG. 3(f) graphically represents test results using LFW dataset data for 600 pairs, determining performance of an Artificial Neural Network (ANN).

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a system and method for inducing sleep loss in animal test subjects, such as rats. In other embodiments, plural cages such as an 8-chamber sleep restriction device can be simultaneously operated.

I. METHODOLOGY

A. Data Preparation

The ANN model was trained by MS-Celeb-1M dataset [9]. MS-Celeb-1M is a large-scale dataset for facial recognition, which contains 5,179,510 RGB facial images of 93,431 celebrities. After ANN is well trained, we randomly choose 2,000 images to normalize the parameters of the ANN while converting it into SNN.

Labeled Faces in the Wild (LFW) dataset was used to evaluate the performance of the ANN and SNN [10]. LFW has 13,233 facial images of 5,749 people. As shown in FIGS. 1(a) and 1(b), we randomly choose 600 pairs of images for testing. In the first 300 pairs, each pair is the same people. While, In the last 300 pairs, each pair has different people.

B. Artificial Neural Network Modeling

ArcFace is a state-of-the-art face feature embedding method based on ANN [7]. FIG. 2 shows the principle of the ArcFace. FIG. 2 is a schematic-type chart representing operational aspects and principles of the ArcFace machine-learning model (Prior Art) for facial recognition. ArcFace directly optimizes the geodesic distance margin by virtue of exact correspondence between angle and arc in the normalized hypersphere. In the reference stage, the backbone output 1D (one-dimensional) features of its input faces. Using flowing equation to calculate the Euclidean distance of two faces' features:

$$e = \sum_{i=1}^{I}(x_i - y_i)^2 \quad (1)$$

where, $x_i$ and $y_i$ are the elements in each feature. If the Euclidean distance e is lower than a certain threshold th, consider these two face images are from the same people. Otherwise, they are not the same people.

Original ArcFace's backbone outputs a 512D vector as the feature. However, while training, it will be embedded to another length to fit the labels. Because the training dataset of ArcFace has 93,431 different people, the embedding size of the output vector is 93,431.

ArcFace has proposed a specially designed loss function called ArcFace loss for computing Softmax loss. ArcFace loss is modified from the cross-entropy loss, increasing similarity for intraclass samples and diversity for inter-class samples. Eq. (2) is the ArcFace loss function.

$$L = -\frac{1}{N}\sum_{I=1}^{1}\log\frac{e^{s(\cos(\theta_{yi}+m))}}{e^{s(\cos(\theta_{yi}+m))} + \sum_{j=1,j\neq y_i}^{n} e^{s\cos\theta_j}} \quad (2)$$

where the definition of these variables can be found in [7].

Consider that the SNN hardware does not support some operations like max-pooling, add, concatenate, etc. This disclosure uses the VGG-8 as the backbone of the ArcFace. Thus, VGG (Visual Geometry Group) is a standard deep Convolutional Neural Network (CNN) architecture with multiple layers, where VGG-8 refers to the number of layers with VGG-8 consisting of 8 convolutional layers. The VGG architecture is the basis of an object recognition models, developed as a deep neural network. As shown in Table 1, this VGG-8 network is a modification of the VGG-11 network [11]. First, VGG-8 deletes two convolutional layers and one fully connected in VGG-11. Second, to fit complex data, VGG-8 has batch normalization operation after each convolution layer and fully connect layer. Third, to improve the network inference speed, VGG-8 does not have the same padding operation; also, VGG-8 has a smaller kernel size than that of VGG-11.

TABLE 1

VGG-8 architecture

| Layers | Operation | Tensor size |
| --- | --- | --- |
|  | Input | 3 × 112 × 112 |
| 1 | 3 × 3 Conv2D (32) + Batch Norm + ReLU | 32 × 11 × 110 |
|  | Average Pooling | 64 × 55 × 55 |
| 2 | 3 × 3 Conv2D (64) + Batch Norm + ReLU | 64 × 53 × 53 |
|  | Average Pooling | 64 × 26 × 26 |
| 3 | 3 × 3 Conv2D (128) + Batch Norm + ReLU | 128 × 24 × 24 |
| 4 | 3 × 3 Conv2D (128) + Batch Norm + ReLU | 128 × 22 × 22 |
|  | Average Pooling | 128 × 11× 11 |
| 5 | 3 × 3 Conv2D (256) + Batch Norm + ReLU | 256 × 9 × 9 |
| 6 | 3 × 3 Conv2D (256) + Batch Norm + ReLU | 256 × 7 × 7 |
|  | Average Pooling | 256 × 3 × 3 |
|  | Flatten | 2304 |
| 7 | Fully connected (1024) + Batch Norm + ReLU | 1024 |
| 8 | Fully connected (512) + Batch Norm | 512 |

VGG-8 networks are programmed based on the PyTorch framework. This disclosure uses the Adam optimizer, one of the most effective optimization algorithms for deep-learning networks [12]. The batch size and epoch number are 256 and 40, respectively.

C. Spiking Neural Network Converting

After ANN is well trained, this disclosure uses the SNN toolbox to convert the ANN to SNN [8]. During the converting process, two main steps happened in the SNN toolbox. The first step is to use some of ANN's training data to normalize the weights of the ANN, and the second step is converting the ANN's layers to SNN's spike layers.

Duration is a vital hyper-parameter for SNN converting, and it determines the number of time-steps to run each prediction. The training latency is defined as the time duration of training the SNN with each input image. In a short duration, neurons have a few chances to fire, resulting in the poor performance of the SNN. On the other hand, in a long duration, output neurons got enough redundancy to have enough firing, but a long duration can increase SNN's latency. This disclosure tested the SNN's performance at the duration of 50, 100, 200, 300, and 400.

Given a facial image, SNN outputs a matrix which is in the shape of [N,512]. N is the duration. This matrix records the spike of the output neurons at each time-step. Then use the following step to convert this matrix into a 1D facial feature. First, sum up the spikes at each neuron, then we got a 512D vector. This vector records how many times each output neuron was fired. Second, normalize this 512D vector to get the final 1D facial feature.

II. EXPERIMENTAL RESULTS

As discussed herein, this disclosure used 600 pairs of facial images to evaluate the performance of ANN and SNNs. For each model, FIGS. 3(a) through 3(e) graphically represent the Euclidean distance (Eq. (1)) between the images in each pair. Each model has its highest accuracy under its Optimal Threshold (OTh). To facilitate the comparison of different models, the Euclidean distances in each model were rescaled by rescaling their OTh to 1.

More specifically, FIGS. 3(a) through 3(e) graphically represent test results using LFW dataset data for 600 pairs, determining performance of a presently-disclosed spiking neural network (SNN) of respective duration criteria of 50, 100, 200, 300, and 400, respectively. FIG. 3(f) graphically represents test results using LFW dataset data for 600 pairs, determining performance of an Artificial Neural Network (ANN). Each of FIGS. 3(a)-3(f) of the 600 pairs represented uses pairs 1-300 for the Same People Pairs (SPP) and pair numbers 301-600 for the Different People Pairs (DPP).

As shown in Table 2, ANN and SNN are supposed to have higher accuracy when they have a large gap between SPP and DPP scatters, and small differences inside SPP and DPP scatters. This disclosure used mean (SPP)−mean (DPP) to measure the gap between SPP and DPP scatters. std (SPP) and std (DPP) can calculate the difference inside the PP and DPP scatters, where mean (*) is the average operation, and std(*) stand for standard deviation.

TABLE 2

Performance comparison between ANN and SNNs

| Models | mean (SPP)-mean (DPP) | std (SPP) | std (DPP) | Accuracy (%) |
|---|---|---|---|---|
| SNN (duration = 50) | 0.579 | 0.195 | 0.225 | 91.16 |
| SNN (duration = 100) | 0.614 | 0.179 | 0.131 | 97.17 |
| SNN (duration = 200) | 0.602 | 0.174 | 0.102 | 99.00 |
| SNN (duration = 300) | 0.611 | 0.177 | 0.099 | 98.67 |
| SNN (duration = 400) | 0.608 | 0.177 | 0.098 | 98.33 |
| ANN | 0.695 | 0.174 | 0.114 | 98.17 |

As shown in FIGS. 3(a)-3(f) and Table 2, although ANN has the highest value 0.695 in mean(SPP)−mean (DPP) and the lowest value 0.695 in std (SPP), SNNs (duration=200, 300, 400) having higher accuracy for them have smaller value in std (DPP). Due to SNN (duration=50) not having enough time-steps to accumulate spikes, it has the lowest accuracy 91.16%. Overall, SNNs (duration=200) generate the highest accuracy 99.00%.

III. CONCLUSION

This disclosure proposed a facial recognition method based on SNN. The SNN model is converted from ArcFace. ArcFace is a state-of-the-art facial recognition method based on ANN. First, ArcFace was trained by the large-scale dataset MS1 M. Then, the SNN toolbox was used to convert the ANN into the SNN. Last, the LFW dataset was used to test the performance of ANN and SNN under different duration. The experimental results show that, for 600 pairs of testing images, SNN (duration=200) achieved 99.00% overall accuracy, which outperforms ANN and SNNs under other durations.

While certain embodiments of the disclosed subject matter have been described using specific terms, such description is for illustrative purposes only, and it is to be understood that changes and variations may be made without departing from the spirit or scope of the subject matter.

REFERENCES

[1] An, Xiang, et al. "Killing Two Birds with One Stone: Efficient and Robust Training of Face Recognition CNNs by Partial FC." arXiv preprint arXiv:2203.15565 (2022).

[2] Chen, Jun-Cheng, et al. "Unconstrained still/video-based face verification with deep convolutional neural networks." International Journal of Computer Vision 126.2 (2018): 272-291.

[3] Tavanaei, Amirhossein, et al. "Deep learning in spiking neural networks." Neural networks 111 (2019): 47-63.

[4] Schroff, Florian, Dmitry Kalenichenko, and James Philbin. "Facenet: A unified embedding for face recognition and clustering." Proceedings of the IEEE conference on computer vision and pattern recognition. 2015.

[5] Liu, Weiyang, et al. "Sphereface: Deep hypersphere embedding for face recognition." Proceedings of the IEEE conference on computer vision and pattern recognition. 2017.

[6] Wang, Hao, et al. "Cosface: Large margin cosine loss for deep face recognition." Proceedings of the IEEE conference on computer vision and pattern recognition. 2018.

[7] Deng, Jiankang, et al. "ArcFace: Additive angular margin loss for deep face recognition." Proceedings of the IEEE/CVF conference on computer vision and pattern recognition. 2019.

[8] Rueckauer, Bodo, et al. "Conversion of continuous-valued deep networks to efficient event-driven networks for image classification." Frontiers in neuroscience 11 (2017): 682.

[9] Guo, Yandong, et al. "Ms-celeb-1m: A dataset and benchmark for large-scale face recognition." European conference on computer vision. Springer, Cham, 2016.

[10] Huang, Gary B., et al. "Labeled faces in the wild: A database for studying face recognition in unconstrained environments." Workshop on faces in 'Real-Life' Images: detection, alignment, and recognition. 2008.

[11] Simonyan, Karen, and Andrew Zisserman. "Very deep convolutional networks for large-scale image recognition." arXiv preprint arXiv:1409.1556 (2014).

[12] Kingma, Diederik P., and Jimmy Ba. "Adam: A method for stochastic optimization." arXiv preprint arXiv:1412.6980 (2014).

What is claimed is:

1. Method for facial recognition for automatically identifying a person from facial images, comprising:
    training an Artificial Neural Network (ANN)-based facial recognition machine learning model, based on inputs of a preexisting large-scale facial image dataset for facial recognition, to learn the association between different facial images of the same person;
    normalizing the parameters of the ANN-based facial recognition machine learning model using a randomly selected subset of facial images which is smaller than the preexisting large-scale dataset used to train the ANN-based facial recognition machine learning model;
    converting the trained ANN-based facial recognition machine learning model with normalized parameters into a trained Spiking Neural Network (SNN)-based facial recognition model; and
    operating the trained SNN-based facial recognition machine learning model to process further input data images thereto, to determine and output the identification of the person corresponding with the input images.

2. The method according to claim 1, wherein the architecture of the Artificial Neural Network (ANN)-based facial recognition machine learning model comprises deep Convolutional Neural Network (CNN) architecture with multiple layers and operates on additive angular margin loss for deep face recognition.

3. The method according to claim 2, wherein the architecture of the Artificial Neural Network (ANN)-based facial recognition machine learning model comprises VGG-8 architecture using eight convolutional layers.

4. The method according to claim 2, wherein the normalizing and converting comprises a converting process to first use some of the training data of the ANN-based facial recognition machine learning model to normalize the parameter weights of the ANN-based facial recognition machine learning model, and then to convert the layers of the ANN-based facial recognition machine learning model to spike layers of the Spiking Neural Network (SNN)-based facial recognition model.

5. The method according to claim 2, wherein the converting of the ANN-based facial recognition machine learning model to the Spiking Neural Network (SNN)-based facial recognition model has a duration hyper-parameter of using at least about 100 time-steps to run each prediction corresponding with the time duration of training the Spiking Neural Network (SNN)-based facial recognition model with each input facial image.

6. The method according to claim 5, wherein the duration hyper-parameter is optimized to run for at least about 200 time-steps for each prediction.

7. The method according to claim 5, wherein for a given facial image, the SNN-based facial recognition machine learning model outputs a matrix in the shape of [N,512], where N is the duration hyper-parameter with which the SNN-based facial recognition machine learning model is operated, whereby the matrix records the spike of the output neurons at each time-step of the duration hyper-parameter.

8. The method according to claim 7, wherein the matrix is converted into a 1D facial feature by first summing up the spikes at each neuron to obtain a 512D vector which records how many times each output neuron was fired, and then normalizing the 512D vector to obtain the final 1D facial feature.

9. The method according to claim 1, further comprising constructing the SNN-based facial recognition machine learning model into an edge-device-ready model which is able to transfer to a mobile computing board for mobile computing.

10. The method according to claim 9, further comprising loading the SNN-based facial recognition machine learning model into a mobile device including at least one of a cellphone, tablet, computing stick, and mobile computing board for increased portability.

11. The method according to claim 1, wherein:
    the architecture of the Artificial Neural Network (ANN)-based facial recognition machine learning model operates on additive angular margin loss for deep face recognition; and
    the randomly selected subset of facial images is taken from the preexisting large-scale dataset used to train the ANN-based facial recognition machine learning model.

12. The method according to claim 11, wherein the architecture of the Artificial Neural Network (ANN)-based facial recognition machine learning model comprises deep Convolutional Neural Network (CNN) architecture with multiple layers comprising VGG-8 architecture using eight convolutional layers.

13. The method according to claim 12, wherein the VGG-8 architecture has batch normalization operation after each convolution layer and each fully connect layer.

14. The method according to claim 13, wherein the VGG-8 architecture has layer architecture comprising:

| Layers | Operation |
|---|---|
| | Input |
| 1 | 3 × 3 Conv2D (32) + Batch Norm + ReLU |
| | Average Pooling |
| 2 | 3 × 3 Conv2D (64) + Batch Norm + ReLU |
| | Average Pooling |
| 3 | 3 × 3 Conv2D (128) + Batch Norm + ReLU |
| 4 | 3 × 3 Conv2D (128) + Batch Norm + ReLU |
| | Average Pooling |
| 5 | 3 × 3 Conv2D (256) + Batch Norm + ReLU |
| 6 | 3 × 3 Conv2D (256) + Batch Norm + ReLU |
| | Average Pooling |
| | Flatten |
| 7 | Fully connected (1024) + Batch Norm + ReLU |
| 8 | Fully connected (512) + Batch Norm. |

15. The method according to claim 14, wherein the VGG-8 architecture has associated tensor size for layer architecture comprising:

| Layers | Operation | Tensor size |
|---|---|---|
| | Input | 3 × 112 × 112 |
| 1 | 3 × 3 Conv2D (32) + Batch Norm + ReLU | 32 × 11 × 110 |
| | Average Pooling | 64 × 55 × 55 |
| 2 | 3 × 3 Conv2D (64) + Batch Norm + ReLU | 64 × 53 × 53 |
| | Average Pooling | 64 × 26 × 26 |
| 3 | 3 × 3 Conv2D (128) + Batch Norm + ReLU | 128 × 24 × 24 |
| 4 | 3 × 3 Conv2D (128) + Batch Norm + ReLU | 128 × 22 × 22 |
| | Average Pooling | 128 × 11 × 11 |
| 5 | 3 × 3 Conv2D (256) + Batch Norm + ReLU | 256 × 9 × 9 |
| 6 | 3 × 3 Conv2D (256) + Batch Norm + ReLU | 256 × 7× 7 |
| | Average Pooling | 256 × 3 × 3 |
| | Flatten | 2304 |

-continued

| Layers | Operation | Tensor size |
|---|---|---|
| 7 | Fully connected (1024) + Batch Norm + ReLU | 1024 |
| 8 | Fully connected (512) + Batch Norm | 512. |

16. The method according to claim 1, further comprising testing the SNN-based facial recognition machine learning model by using a plurality of randomly chosen pairs of facial images, one-half of which are same people pairs and one-half of which are different people pairs.

17. The method according to claim 1, further comprising providing one or more programmed processors for implementing the trained ANN-based facial recognition machine learning model and the trained SNN-based facial recognition machine learning model.

18. A computing system, the computing system comprising:
an Artificial Neural Network (ANN)-based facial recognition machine learning model trained to learn the association between different facial images of the same person, based on inputs of a preexisting large-scale facial image dataset for facial recognition;
one or more processors; and
one or more non-transitory computer-readable media that store instructions that, when executed by the one or more processors, cause the one or more processors to perform operations, the operations comprising:
normalizing the parameters of the ANN-based facial recognition machine learning model using a randomly selected subset of facial images which is smaller than the preexisting large-scale dataset used to train the ANN-based facial recognition machine learning model;
converting the trained ANN-based facial recognition machine learning model with normalized parameters into a trained Spiking Neural Network (SNN)-based facial recognition model; and
operating the trained SNN-based facial recognition machine learning model to process further input data images thereto, to determine and output the identification of the person corresponding with the input images.

19. The computing system according to claim 18, wherein the architecture of the Artificial Neural Network (ANN)-based facial recognition machine learning model comprises deep Convolutional Neural Network (CNN) architecture with multiple layers operating on additive angular margin loss for deep face recognition.

20. The computing system according to claim 19, wherein the architecture of the Artificial Neural Network (ANN)-based facial recognition machine learning model comprises VGG-8 architecture using eight convolutional layers.

21. The computing system according to claim 19, wherein the operations further comprise normalizing and converting through a converting process which first uses some of the training data of the ANN-based facial recognition machine learning model to normalize the parameter weights of the ANN-based facial recognition machine learning model, and then converts the layers of the ANN-based facial recognition machine learning model to spike layers of the Spiking Neural Network (SNN)-based facial recognition model.

22. The computing system according to claim 19, wherein the operations further comprise converting of the ANN-based facial recognition machine learning model to the Spiking Neural Network (SNN)-based facial recognition model using a duration hyper-parameter of at least about 100 time-steps to run each prediction corresponding with the time duration of training the Spiking Neural Network (SNN)-based facial recognition model with each input facial image.

23. The computing system according to claim 22, wherein the operations further comprise using a duration hyper-parameter of at least about 200 time-steps for each prediction.

24. The computing system according to claim 18, wherein the one or more processors, and one or more non-transitory computer-readable media are received on and operative on a mobile device including at least one of a cellphone, tablet, computing stick, and mobile computing board.

25. The computing system according to claim 18, wherein:
the architecture of the Artificial Neural Network (ANN)-based facial recognition machine learning model operates on additive angular margin loss for deep face recognition; and
the operations further comprise taking the randomly selected subset of facial images from the preexisting large-scale dataset used to train the ANN-based facial recognition machine learning model.

26. The computing system according to claim 25, wherein the architecture of the Artificial Neural Network (ANN)-based facial recognition machine learning model comprises deep Convolutional Neural Network (CNN) architecture with multiple layers comprising VGG-8 architecture using eight convolutional layers.

27. The computing system according to claim 26, wherein the VGG-8 architecture has layer architecture comprising:

| Layers | Operation |
|---|---|
|  | Input |
| 1 | 3 × 3 Conv2D (32) + Batch Norm + ReLU<br>Average Pooling |
| 2 | 3 × 3 Conv2D (64) + Batch Norm + ReLU<br>Average Pooling |
| 3 | 3 × 3 Conv2D (128) + Batch Norm + ReLU |
| 4 | 3 × 3 Conv2D (128) + Batch Norm + ReLU<br>Average Pooling |
| 5 | 3 × 3 Conv2D (256) + Batch Norm + ReLU |
| 6 | 3 × 3 Conv2D (256) + Batch Norm + ReLU<br>Average Pooling<br>Flatten |
| 7 | Fully connected (1024) + Batch Norm + ReLU |
| 8 | Fully connected (512) + Batch Norm. |

28. One or more tangible, non-transitory computer-readable media that collectively store instructions that, when executed, cause a computing device including one or more processors to perform operations, the operations comprising:
training an Artificial Neural Network (ANN)-based facial recognition machine learning model, based on inputs of a preexisting large-scale facial image dataset for facial recognition, to learn the association between different facial images of the same person;
normalizing the parameters of the ANN-based facial recognition machine learning model using a randomly selected subset of facial images which is smaller than the preexisting large-scale dataset used to train the ANN-based facial recognition machine learning model;
converting the trained ANN-based facial recognition machine learning model with normalized parameters into a trained Spiking Neural Network (SNN)-based facial recognition model; and operating the trained SNN-based facial recognition machine learning model to process further input data images thereto, to determine and output the identification of the person corresponding with the input images.

29. The one or more tangible, non-transitory computer-readable media according to claim 28, wherein the architecture of the Artificial Neural Network (ANN)-based facial recognition machine learning model comprises deep Convolutional Neural Network (CNN) architecture with multiple layers operating on additive angular margin loss for deep face recognition.

30. The one or more tangible, non-transitory computer-readable media according to claim 29, wherein the architecture of the Artificial Neural Network (ANN)-based facial recognition machine learning model comprises VGG-8 architecture using eight convolutional layers.

31. The one or more tangible, non-transitory computer-readable media according to claim 29, wherein the operations further comprise normalizing and converting through a converting process which first uses some of the training data of the ANN-based facial recognition machine learning model to normalize the parameter weights of the ANN-based facial recognition machine learning model, and then converts the layers of the ANN-based facial recognition machine learning model to spike layers of the Spiking Neural Network (SNN)-based facial recognition model.

32. The one or more tangible, non-transitory computer-readable media according to claim 29, wherein the operations further comprise converting of the ANN-based facial recognition machine learning model to the Spiking Neural Network (SNN)-based facial recognition model using a duration hyper-parameter of at least about 100 time-steps to run each prediction corresponding with the time duration of training the Spiking Neural Network (SNN)-based facial recognition model with each input facial image.

33. The one or more tangible, non-transitory computer-readable media according to claim 32, wherein the operations further comprise using a duration hyper-parameter of at least about 200 time-steps for each prediction.

34. The one or more tangible, non-transitory computer-readable media according to claim 28, wherein the computing device and the one or more tangible, non-transitory computer-readable media are received on and operative on a mobile device including at least one of a cellphone, tablet, computing stick, and mobile computing board.

35. The one or more tangible, non-transitory computer-readable media according to claim 28, wherein:

the architecture of the Artificial Neural Network (ANN)-based facial recognition machine learning model operates on additive angular margin loss for deep face recognition; and the operations further comprise taking the randomly selected subset of facial images from the preexisting large-scale dataset used to train the ANN-based facial recognition machine learning model.

36. The one or more tangible, non-transitory computer-readable media according to claim 35, wherein the architecture of the Artificial Neural Network (ANN)-based facial recognition machine learning model comprises deep Convolutional Neural Network (CNN) architecture with multiple layers comprising VGG-8 architecture using eight convolutional layers.

\* \* \* \* \*